(12) United States Patent
Gross et al.

(10) Patent No.: US 11,167,449 B2
(45) Date of Patent: Nov. 9, 2021

(54) DEVICE AND METHOD FOR IMPREGNATING FIBER BUNDLES WITH A POLYMER MELT

(71) Applicant: FEDDEM GmbH & Co. KG, Sinzig (DE)

(72) Inventors: Dieter Gross, Pfungstadt (DE); Sebastian Jost, Wehr (DE)

(73) Assignee: Feddem GmbH & Co. KG, Sinzig (DE)

( * ) Notice: Subject to any disclaimer, the term of this patent is extended or adjusted under 35 U.S.C. 154(b) by 0 days.

(21) Appl. No.: 16/756,778

(22) PCT Filed: Oct. 5, 2018

(86) PCT No.: PCT/EP2018/077179
§ 371 (c)(1),
(2) Date: Apr. 16, 2020

(87) PCT Pub. No.: WO2019/076653
PCT Pub. Date: Apr. 25, 2019

(65) Prior Publication Data
US 2020/0238573 A1 Jul. 30, 2020

(30) Foreign Application Priority Data

Oct. 16, 2017 (EP) .................................... 17196681

(51) Int. Cl.
*B29B 15/12* (2006.01)
*B29C 70/52* (2006.01)
*B29C 48/025* (2019.01)

(52) U.S. Cl.
CPC ........ *B29B 15/122* (2013.01); *B29C 48/0255* (2019.02); *B29C 70/523* (2013.01)

(58) Field of Classification Search
CPC ..... B29B 15/12; B29B 15/122; B29B 15/125; B29B 15/14; B29C 70/504; B29C 70/52;
(Continued)

(56) References Cited

U.S. PATENT DOCUMENTS 3,874,329 A * 4/1975 McLarty ............. B29C 53/8066
118/125
4,532,169 A * 7/1985 Carley ................ B29C 53/8016
428/109

(Continued)

FOREIGN PATENT DOCUMENTS

EP 2701886 B1 * 11/2016 ........... B05C 5/0241

*Primary Examiner* — Jeffrey M Wollschlager
(74) *Attorney, Agent, or Firm* — Thomas M. Freiburger

(57) ABSTRACT

The invention relates to a device for impregnating fiber bundles with a polymer melt, in which device fiber bundles, which are inserted in parallel with one another into a slot-like infeed of an impregnation unit (4), are guided through between two guide plates (16, 17), which have undulating surfaces and are arranged so as to be complementary to one another at a defined spacing, and are discharged from the impregnation unit (4) via an outlet (28), the fiber bundles being saturated with the polymer melt while passing through the impregnation unit (4), which polymer melt following the slot-like infeed is introduced between the guide plates (16, 17) into the passage (29). According to the invention, the impregnation unit (4) comprises at least two passages (29) for a defined number of fiber bundles in each case, the passages (29) each comprising an inlet (26) for polymer melt.

11 Claims, 5 Drawing Sheets

Figure 1:
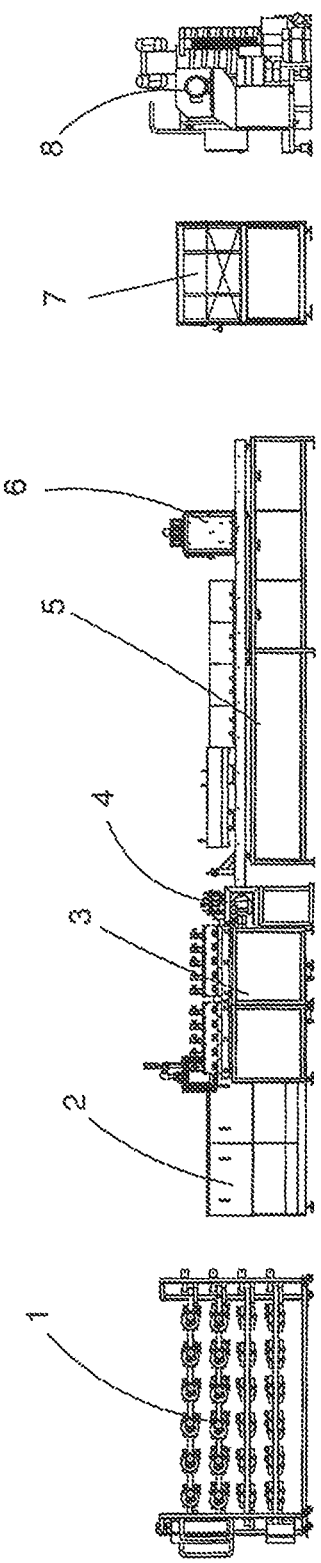

(58) Field of Classification Search
CPC ... B29C 70/521; B29C 70/522; B29C 70/523; B29C 70/524; B29C 70/526
See application file for complete search history.

(56) References Cited

U.S. PATENT DOCUMENTS

| | | | | |
|---|---|---|---|---|
| 5,116,450 | A * | 5/1992 | Spoo | B29C 70/526 156/180 |
| 5,198,172 | A * | 3/1993 | Spoo | B29C 33/306 156/180 |
| 5,447,793 | A * | 9/1995 | Montsinger | B29C 70/50 118/110 |
| 5,658,513 | A * | 8/1997 | Amaike | B29C 70/50 264/171.13 |
| 5,948,473 | A * | 9/1999 | Saito | B29B 15/125 427/289 |
| 6,258,453 | B1 * | 7/2001 | Montsinger | B29C 48/33 428/298.1 |
| 6,387,179 | B1 * | 5/2002 | Anderson | B29B 15/122 118/125 |
| 9,623,437 | B2 * | 4/2017 | Tibor | B05C 5/0241 |
| 2003/0157280 | A1 * | 8/2003 | Boissonnat | E06B 3/221 428/34.1 |
| 2007/0227646 | A1 * | 10/2007 | Yano | B29C 70/50 156/180 |
| 2013/0147082 | A1 * | 6/2013 | Johnson | B29C 48/156 264/136 |
| 2013/0147083 | A1 * | 6/2013 | Eastep | B29C 48/156 264/137 |
| 2013/0147084 | A1 * | 6/2013 | Johnson | B29C 41/30 264/137 |
| 2015/0044377 | A1 * | 2/2015 | Tibor | B05C 5/027 427/358 |

* cited by examiner

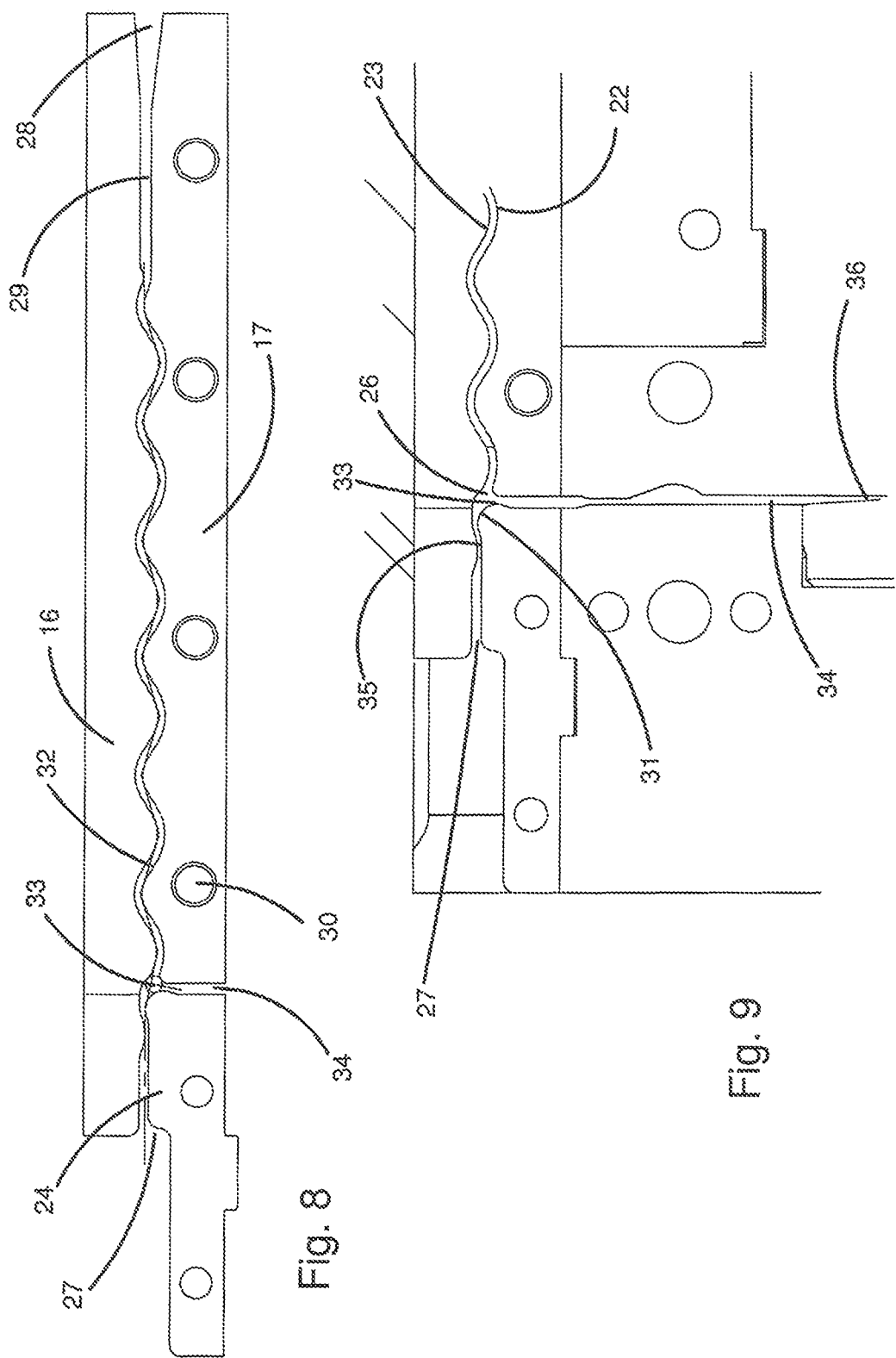

DEVICE AND METHOD FOR IMPREGNATING FIBER BUNDLES WITH A POLYMER MELT

BACKGROUND OF THE INVENTION

This application claims priority from international application number PCT/EP2018/077179, filed Oct. 5, 2018, which claimed priority from European application number EP17196681.5, filed Oct. 16, 2017.

The invention relates to a device for impregnating fiber bundles with a polymer melt according to the preamble of claim 1.

Plastics materials are used in many industrial sectors, being used for lightweight components and other molded parts, to which fiber materials of glass or carbon are added in order to save weight while at the same time imparting great strength, Such materials are used inter alia in many ways in the automobile industry and in aircraft manufacturing.

To reinforce elongate building materials, such as tubes, cables, hoses, etc., also elongate fiber materials are used, said fiber materials being embedded in plastics materials and imparting in particular longitudinal strength to the building materials. Even a small content of fibers in the plastics materials leads to a considerable increase in strength.

Fiber-reinforced plastics moldings are produced as a rule by injection molding, flow molding, thermoforming or continuous extrusion installations, to which are supplied the plastics granules/pellets or plastics ribbons/tapes to which fibers have been added.

Granules or tapes produced for such purposes are usually produced by continuous filaments—in the form of what are called rovings as bundles of ultra-fine fibers of glass, carbon or other materials, such as aramid—which are drawn off from a supply being first of all spread over a tensioning device, then saturated with a plastics melt, thereafter calibrated and cooled, and finally being divided into granules of a length of 3-50 mm, or wound up as a continuous tape. These granules or tapes are then delivered to plastics processors, who produce components of different types from these starting materials.

One critical step in the process sequence is the impregnation of the fiber bundles with plastics material. It is known to guide the spread fiber bundles under tension through a passage between two, guide plates which contain corresponding undulating surfaces, with the fiber bundles at the passage entrance being penetrated by polymer melt supplied from above or below. On passing further between the guide plates, the penetration with the polymer melt improves owing to multiple deflecting and contacting of the fiber bundles on undulations of the guide plates.

A corresponding die for impregnating a fiber roving with a polymer resin, in which the runner to the passage has a particular configuration of the cross-section in order to bring up uniform supplying of polymer melt to the passage between the guide plates, is known from EP 2701886 B1.

EP 2517854 B1 relates to a partial aspect of the die which is concerned with the location of the entry of the polymer melt into the passage. Therein, an impregnation unit is specified in which the inlet for the fiber bundles into the passage between the guide plates is configured such that the roving prior to entering the passage is raised such that a slot between the outlet of the polymer melt and the tape-like roving is minimized. Thus the polymer melt supplied from the upper side at its outlet from the runner strikes the roving immediately and can penetrate it directly.

An impregnating die, in which the polymer melt is supplied in a first undulation trough in the lower guide plate, is specified in U.S. Pat. No. 5,277,566. The roving at this point runs in the middle region of the passage.

The uniform supply of plastics melt across the full width of the impregnation unit is critical. In particular when there are a large number of fiber bundles to be processed simultaneously, it is possible only with difficulty to set or to control sufficiently accurately the pressure conditions, the temperature and the flow rate of the melt across the full width of the passage or the inlet region for melt into the passage.

The object of the invention is therefore to devise an improved device for impregnating fiber bundles with a polymer melt in which the homogeneity of the penetration of the fiber bundles is improved, the device can be adapted simply to different requirements, and is also capable of processing different plastics materials with one configuration of the installation.

This object is achieved by the invention set forth in the claims. Advantageous developments of the invention are set forth in dependent claims.

The invention departs from a device for impregnating fiber bundles with a polymer melt, in which device the fiber bundles, which are inserted in parallel with one another into a slot-like infeed of an impregnation unit, are guided through between two guide plates, which have undulating surfaces and are arranged so as to be complementary to one another at a defined spacing. The fiber bundles are saturated with the polymer melt while passing through the impregnation unit, which polymer melt following the slot-like infeed is introduced between the guide plates into the passage.

According to the invention, the impregnation unit comprises at least two passages for a defined number of fiber bundles in each case, the passages in each case comprising an inlet for polymer melt.

In a preferred configuration of the invention, the impregnation unit therefore consists of at least two sub-units arranged in parallel, which may be coupled laterally to each other, and which in each case comprise an inlet for polymer melt, the sub-units containing in each case a slot-like infeed and en outlet for a defined number of fiber bundles.

Instead of as large as possible an impregnation unit, the invention takes the opposite route, by subdividing the impregnation unit into smaller units to which the polymer melt is supplied separately from each other. This yields the advantage that the device can be adapted flexibly to different requirements, with at the same time complete control of the parameters of the device continuing to be guaranteed. This division also makes it possible to run different parameters on the installation in each sub-unit, for example with different plastics materials or fill levels.

If the installation is running at low capacity, one sub-unit can also be deactivated, or even disconnected without problems. Conversely, if demand is greater, additional units may be added thereto. This thus yields a high degree of flexibility of the installation, and also a saving in terms of energy and costs.

To further improve the impregnation quality, the invention preferably provides for the infeed for the fiber bundles to be provided with a region of reduced slot height which deflects the fiber bundles prior to entering the passage of the impregnation unit such that an increased tensile force can be exerted on the fiber bundles running through the impregnation unit.

The inlet of the polymer melt into the passage between the guide plates in a preferred configuration of the invention is located between a trough and a peak of the undulations of the guide plates, the passage height between the guide plates being maximized in the inlet region of the polymer melt. Thus improved temperature control of the supplied melt with improved defined penetration and impregnation of the fiber bundles can be produced. In addition, via a taper at the polymer inlet a downstream direction is imposed on the melt, which serves for better filling of the impregnation zone.

The sub-units of the impregnation unit are formed in particular from a main unit which contains the guide plates, side parts, a front plate and a downstream die plate. The infeed of the fiber bundles is preferably located between the upper side of the front plate and a front attachment of the upper guide plate. If a plurality of sub-units are coupled directly to each other, only one common side part in each case is necessary between two sub-units, or the sub-units in a further embodiment may also be coupled directly without a common side part.

The respective runner for supplying the polymer melt is located between the end face of the main part and the front plate. Here, a distributor region for distributing the polymer melt across the full width of a sub-unit is also formed. The configuration of sub-units therefore to a considerable extent simplifies the distribution of the polymer melt.

Preferably each sub-unit can process a number of 3-70, preferably 10-30, fiber bundles.

The method according to the invention preferably provides for the fiber bundles prior to entering the impregnation unit to be divided into at least two or more fiber bundle groups which are introduced separately from each other into one sub-unit in each case.

In each sub-unit, the tensile stresses, throughput rates, temperatures and pressures can be set or regulated variably as required.

The sub-units may also be supplied with polymer melts of different materials.

Finally, the guide plates may also be brought into an oscillating, in particular low-frequency sinusoidal movement, in order to improve further the penetration of the fibers with polymer melt.

The invention will be discussed in greater detail below with reference to an embodiment.

Figure 2:
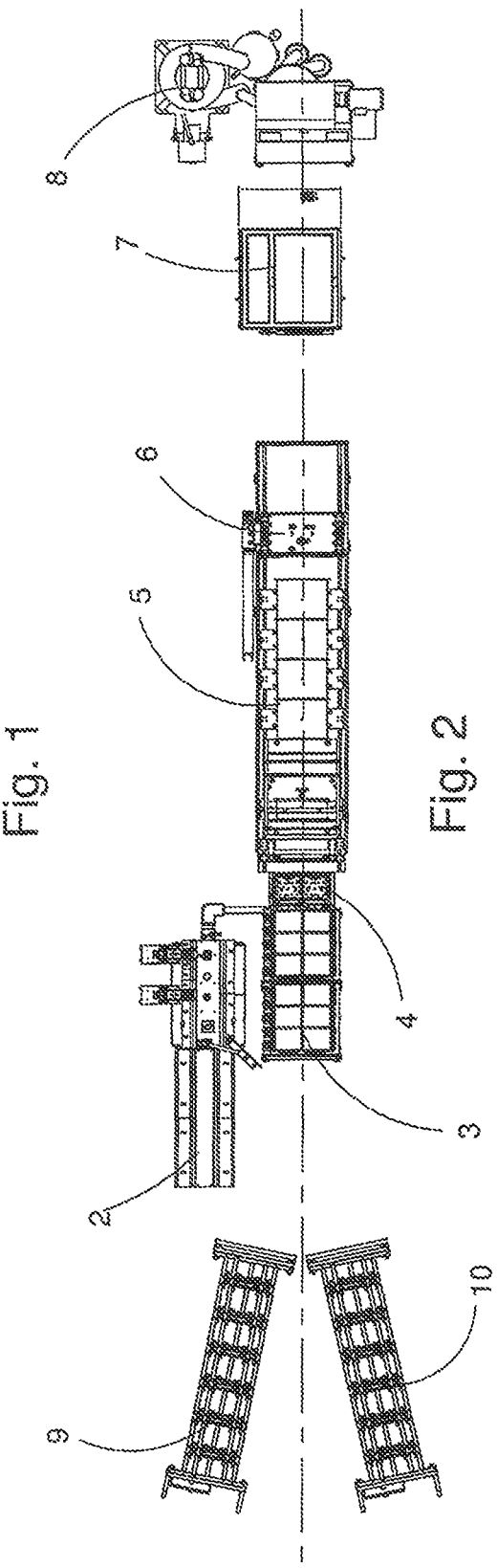
Figure 3:
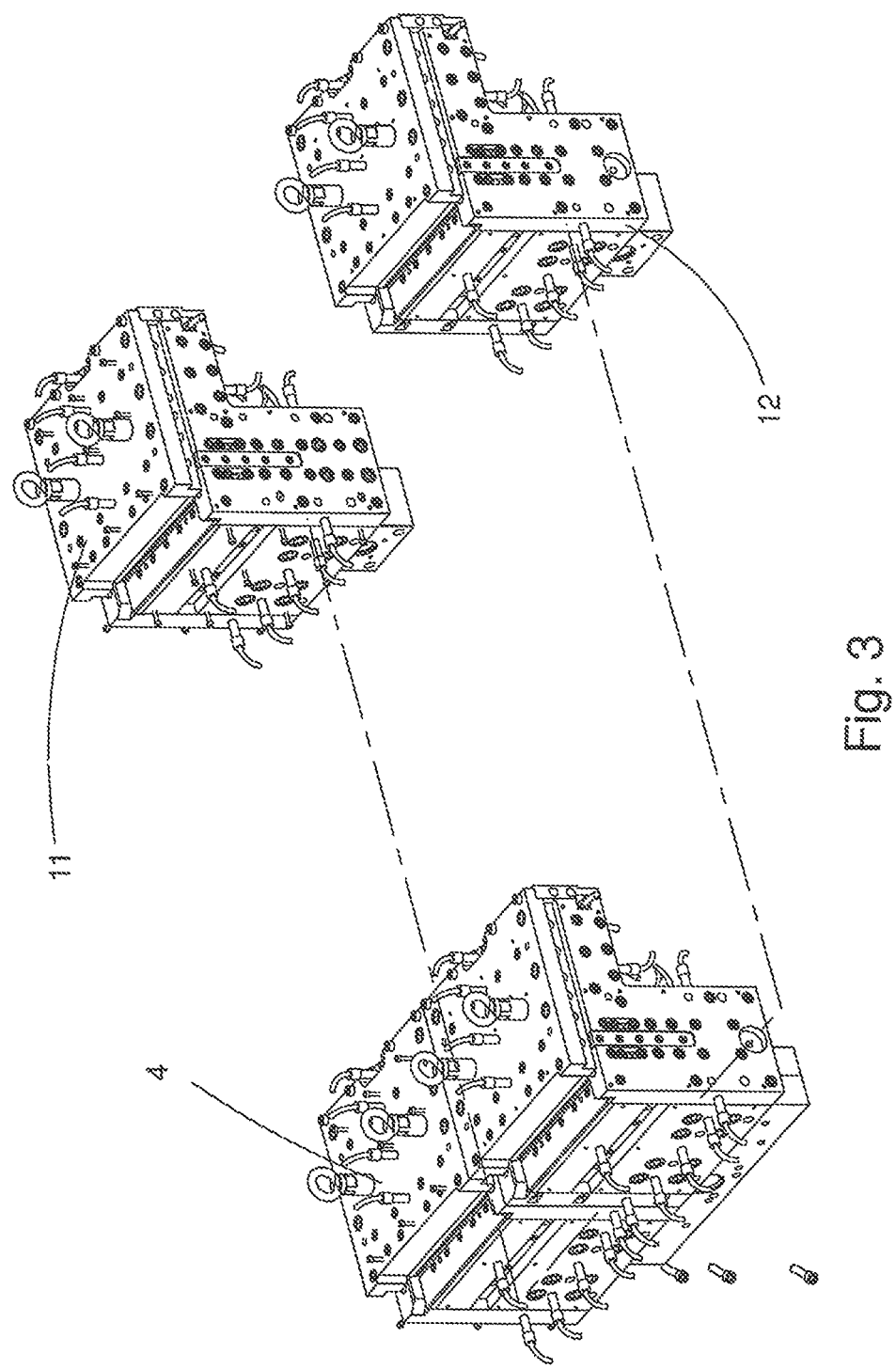
Figure 4:
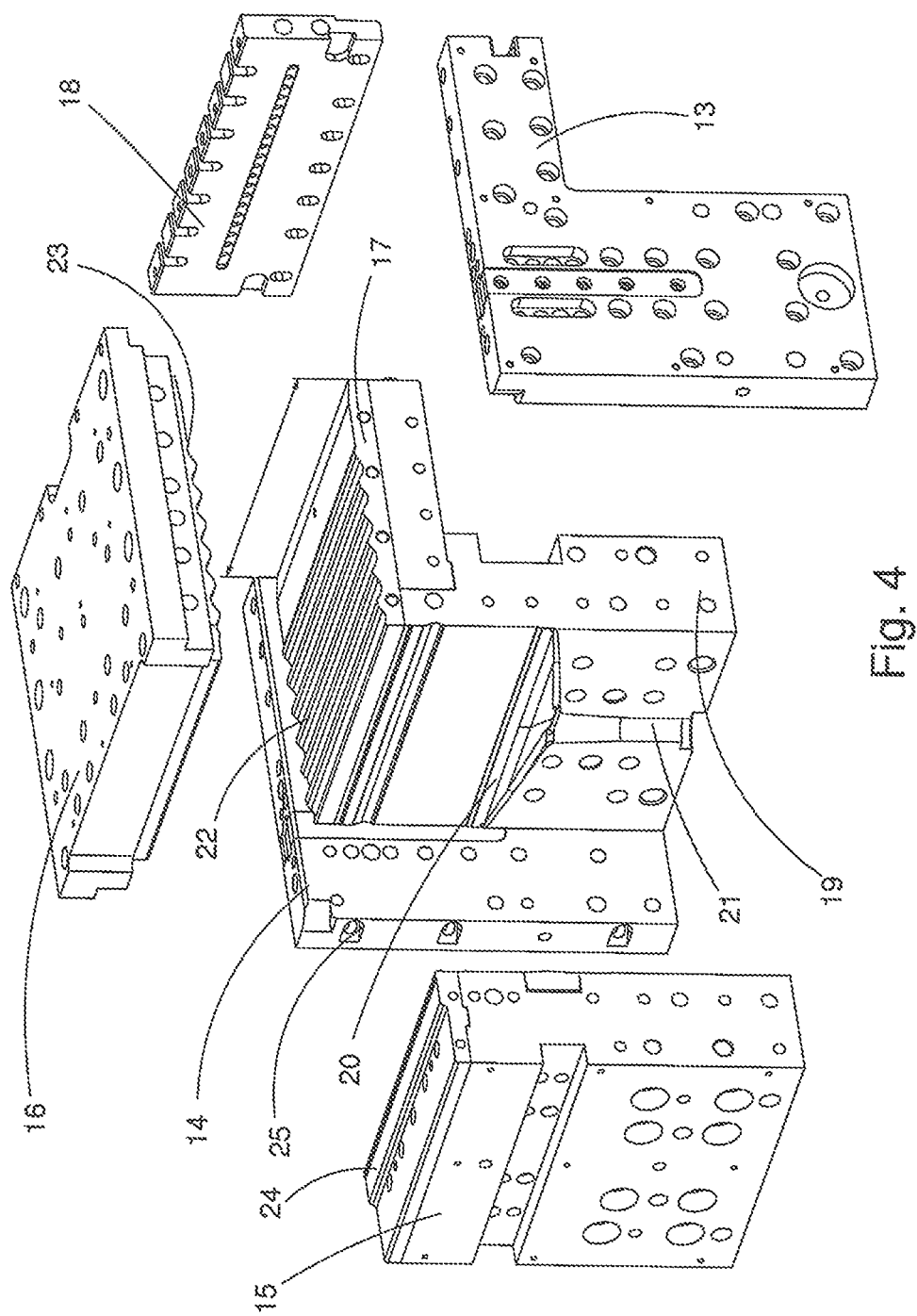
Figures 5, 6, 7:
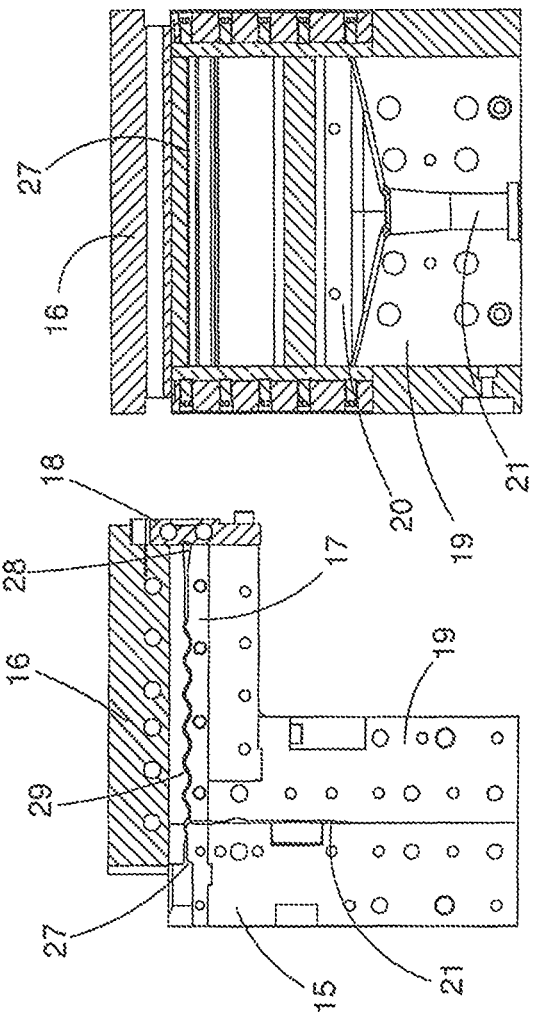

FIG. 1 is an overall view of an installation for producing plastics granules with fiber material added thereto, in a side view, FIG. 2 is a top view of an installation of FIG. 1, FIG. 3 is an impregnation unit, consisting of two sub-units, FIG. 4 is an exploded view of the individual parts of a sub-unit, FIG. 5 is a front view of the front plate of a sub-unit, FIG. 6 is a sectional view through a sub-unit, FIG. 7 is a front view of the main part, FIG. 8 is a view of the arrangement of the guide plates, and FIG. 9 is a detail view of the inlet for polymer melt into the passage between the guide plates.

The device according to the invention is capable of impregnating fiber bundles of different types with polymer material. "Fibers" are to be understood to mean any type of fibers which have a great longitudinal strength, such as glass fibers, carbon fibers, fine strands, textile threads, aramid fibers or similar products. Suitable polymer materials for impregnation are in particular PA, PP, PE and other thermoplastic materials which are suitable for coating and impregnating fiber materials. Thermoplastic materials are however difficult to join to fiber materials, so intensive penetration of the fiber materials in an impregnation unit is necessary.

A roving is the bunching of a large number of the aforementioned fibers to form a strand, which here is referred to substantially as "fiber bundle." The number of fibers in a strand may be up to several thousand, and a roving may be several kilometers long. It is usually rolled up on a roll.

Once a roving has been impregnated and coated, the strand produced is divided into short pieces and made available to plastics processors for further processing as granules. These may produce high-strength and lightweight products, such as tubes and other molded parts, from the granules. In the case of tape production, the impregnated rovings are wound up as a continuous tape.

FIG. 1 illustrates a side view of an installation for producing granules. A creel rack 1 contains, in a frame, a relatively large number of fiber bundles that can be unreeled, which are rolled up for instance in cord-like manner on rolls of the creel rack 1 and can be unreeled therefrom in controlled manner. The individual fiber bundles are then introduced into a tensioning unit 3, in which they are arranged in parallel next to one another and in each case are spread by stretching.

From the tensioning unit, the fiber bundles are transferred into the impregnation unit 4, in which they are permeated with polymer melt. In a subsequent water bath section 5, the composite consisting of fibers and polymer is cooled, and, at the end of the water bath section, converted into a cylindrical form via forming rollers 6. There follows a tape takeoff 7, by which the longitudinal tension of the fiber/polymer composite in the installation can be maintained. The fiber/polymer composite is then supplied to a granulator 8 and divided into pellets/granules.

FIG. 2 shows a top view of an installation according to FIG. 1. The creel rack is formed from two partial creel racks 9 and 10 arranged next to one another at an angle, which in each case receive a number of spools. The fiber bundles taken off therefrom run into the pretensioning unit 3, in which they are stretched and preheated and then are supplied to the impregnation unit 4, which is formed from two sub-units arranged in parallel.

Associated with the impregnation unit is an extruder 2 which makes available the polymer melt for impregnating the fiber bundles. The fiber bundle groups in the further process sequence are processed in parallel, but may also undergo different further process steps as required.

FIG. 3 shows an impregnation unit 4, which is composed of two sub-units 11 and 12. The sub-units are constructed in the same way, and can treat one group of fiber bundles in each case. The impregnation unit 4 may also be formed from more than two sub-units. With a number of 20 fiber bundles to be processed in each case, thus for three sub-units 60 fiber bundles can be processed simultaneously. The sub-units are preferably flanged to each other by a screw connection 25. They may however also be independent of each other.

FIG. 5 shows a dismantled sub-unit. It consists of a main part 19, which bears a lower guide plate 17 on the upper side. The main part is delimited in the transverse direction by side parts 13 and 14. On the end face of the main part (viewed counter to the infeed direction of the fibers) there is a front plate, and an upper guide plate 16 is arranged on the upper side of the main part. A die plate 18 is fastened to the rearward end.

Lower and upper guide plates 16 and 17 at a small spacing from each other of 0.5-8 mm have a passage through which the fiber bundles are guided. The surfaces of the guide plates 16 and 17 are provided with an undulating surface 22 or 23 respectively so as to be complementary to one another. On the end face of the main part 19 there can be seen one half of the runner 21, the other half of which (not shown) is formed on the rear side of the front part 15. The runner 21 opens upward into a distributor region 20, in which supplied polymer melt is distributed in the width and thus runs across the full width of the front side of the main part.

FIG. 5 shows an end view of the front plate 15 with side parts 13 and 14. The figure shows in particular the infeed 27, into which the fiber bundles are introduced into the impregnation unit.

FIG. 6 shows a sectional view of a sub-unit with main part 19, front plate 15, upper guide plate 16, lower guide plate 17 and the passage 29 between the upper and lower guide plates 16 and 17. Via the infeed 27, the fiber bundles are introduced into the impregnation unit, run under longitudinal tension through the passage 29 until they emerge from the passage 29 via the outlet 28, and then emerge from the impregnation unit calibrated through the subsequent die plate 18. The supply of the polymer melt takes place from below via the runner 21, which is connected to an extruder.

FIG. 7 once again shows the distributor region on the end face of the main part 19, the distributor region containing a plurality of distribution lands and deflections which ensure that the polymer melt is distributed uniformly across the full width of the sub-unit.

FIG. 8 shows an enlarged illustration of the arrangement of the guide plates 16 and 17 relative to each other. The arrangement of the plates defines a passage 29 of 0.5-8 mm, through which the fiber bundle 32 is drawn from the infeed 27 to the outlet 28. Owing to the longitudinal tension on the fiber bundle which is applied, the fiber bundle while passing through the passage contacts the respective peaks of the undulating guide plates at a number of points and thereby is penetrated by polymer melt in an improved manner. The necessary plasticity of the melt while the fiber bundles are passing through is maintained via a heating device 30.

The polymer melt is supplied to the passage via the melt flow-way 34, which extends across the full width of the sub-unit, at the polymer exit 33 and soaks the fiber bundle there.

FIG. 9 shows a view, enlarged further, of the region in which the polymer melt enters the passage 29 at the inlet 26. The polymer exit is located on a falling leg of the undulating passage 29 between a trough and a peak, and is angled in the direction of travel of the fiber bundle, so that the angle of deflection of the melt upon entry into the passage 29 is minimized. For better thermal control of the exit point, the passage is enlarged somewhat in this region, in order to concentrate a larger amount of melt at this point. In addition, a downstream direction is imposed, via a taper of the melt flow-way at the polymer inlet, on the melt which serves for better filling of the impregnation zone.

In a further configuration, the melt flow-way may be constricted or widened via an adjustable rail-like choke point 36, in order to be able to vary the pressure of the polymer melt.

If the inlet 26 into the passage 29 is displaced further onto a following rising leg between a trough and a peak, a shallower angle of the entry of the melt into the passage can be achieved. As an alternative to the illustration in FIG. 9, the undulating form of the guide plates can also be formed vertically mirrored, so that the inlet 26 into the passage 29 is already located on that (rising) leg between a trough and peak which is first in the direction of travel of the fiber bundles.

By a tensioning region 35 with reduced passage height following an infeed face 24 and with subsequent arcuate shape 31 at the beginning of the undulating passage 29, the tension on the fiber bundles which is necessary in the impregnating device can be increased further.

In order to achieve a still further improvement in the penetration of the polymer melt by the fiber bundles, the impregnating device may also contain a device for generating a slight oscillating movement of at least one of the guide plates.

REFERENCE NUMERALS 1 creel rack 19 main part. 2 extruder 20 distributor region
3 pretensioning unit 21 runner
4 impregnation unit 22 lower surface
5 water bath 23 upper surface
6 forming rollers 24 infeed face
7 tape takeoff 25 screw connection
8 granulator 26 inlet
9 partial creel rack 27 infeed
10 partial creel rack 28 outlet
11 sub-unit 29 passage
12 sub-unit 30 heating means
13 side plate 31 arc
14 side plate 32 fiber bundle
15 front plate 33 polymer exit
16 upper guide plate 34 melt flow-way
17 lower guide plate 35 tensioning region
18 die plate 36 choke point

The invention claimed is:

1. A device for impregnating previously unimpregnated strand-shaped fiber bundles (32) with a polymer melt, in which device a plurality of fiber bundles (32), which are inserted in parallel with one another into a slit-shaped infeed (27) of an impregnation unit (4), are guided through between two guide plates (16, 17), which have undulating surfaces (22, 23), and are arranged so as to be complementary to one another at a defined spacing, and are discharged from the impregnation unit (4) via an outlet (28), the fiber bundles (32) being saturated with the polymer melt while passing through the impregnation unit (4), which polymer melt following the slit-shaped infeed (27) is introduced into a passage (29) between the guide plates (16, 17), characterized in that the impregnation unit (4) is formed from at least two independently operable sub-units (11, 12) arranged in parallel and detachably coupled to each other, each sub-unit including a slit-shaped infeed (27), an outlet (28) and a said passage (29) between guide plates (16, 17) for a defined number of fiber bundles (32) in each case, each said passage (29) each comprising an inlet (26) for polymer melt located at an upstream end of the undulating surfaces defining the passage (29).

2. The device according to claim 1, characterized in that in each sub-unit the respective slit-shaped infeed (27) in the direction of travel of the fiber bundles has a region (35) of reduced slot height which makes a seamless transition into said passage between the guide plates (16, 17), and in that the passage height between the guide plates (16, 17) in the region of the inlet of the polymer melt is increased compared with the region of reduced slot height.

3. The device according to claim 2, characterized in that the region of reduced slot height causes the fiber bundles to be deflected out of their direction of travel in the passage (29) by increasing the tensile force on the fiber bundles.

4. The device according to claim 2, characterized in that in each sub-unit the inlet (26) is located in the region of the first undulation peak or trough of the guide plates (16, 17) between a trough and a peak of the undulations of the guide plates (16, 17).

5. The device according to claim 2, characterized in that at the polymer inlet (26) a channel constriction is provided, via which deflection of the polymer melt in the direction of travel of the fiber bundles takes place.

6. The device according to claim 1, characterized in that the sub-units (11, 12) contain at their outlet (28) in each case a die plate (18) by which the fiber bundles which are saturated with polymer melt are calibrated in diameter.

7. The device according to claim 1, characterized in that the sub-units (11, 12) are formed in multiple parts with side parts (13, 14), a front plate (15) and a main part (19) comprising the guide plates (16, 17), the infeed (27) of the fiber bundles being formed between an upper side of the front plate (15) and a front region of an upper guide plate (16) of the two guide plates (16, 17).

8. The device according to claim 7, characterized in that the front plate (15) is flanged to the main part (19), and in that a runner (21) to the respective inlet (26) of polymer melt is formed between an end face of the main part (19) and the front plate (15).

9. The device according to claim 8, characterized in that the runner (21) for supplying polymer melt comprises at each sub-unit a distributor region (20) in which the polymer melt is widened to a melt ribbon running across the full width of the sub-unit (11, 12), which melt ribbon is supplied to the inlet (26) for polymer melt between the guide plates (16, 17).

10. The device according to claim 1, characterized in that the number of fiber bundles guided through each sub-unit (11, 12) is between 3 and 70.

11. The device according to claim 10, wherein the number of fiber bundles guided through each sub-unit (11, 12) is between 10 and 30.

* * * * *